(12) United States Patent
Hongo

(10) Patent No.: US 11,870,193 B2
(45) Date of Patent: Jan. 9, 2024

(54) BUSBAR UNIT AND METHOD OF MANUFACTURING BUSBAR UNIT

(71) Applicant: ASTER CO., LTD., Yokote (JP)

(72) Inventor: Takenobu Hongo, Fukushima (JP)

(73) Assignee: ASTER CO., LTD., Yokote (JP)

( * ) Notice: Subject to any disclaimer, the term of this patent is extended or adjusted under 35 U.S.C. 154(b) by 322 days.

(21) Appl. No.: 17/430,612

(22) PCT Filed: Jan. 31, 2020

(86) PCT No.: PCT/JP2020/003627
§ 371 (c)(1),
(2) Date: Aug. 12, 2021

(87) PCT Pub. No.: WO2020/170761
PCT Pub. Date: Aug. 27, 2020

(65) Prior Publication Data
US 2022/0109251 A1    Apr. 7, 2022

(30) Foreign Application Priority Data

Feb. 19, 2019 (JP) .................................. 2019-027557

(51) Int. Cl.
*H01R 43/02* (2006.01)
*H01R 4/02* (2006.01)
(Continued)

(52) U.S. Cl.
CPC ............. *H01R 4/029* (2013.01); *H01R 4/625* (2013.01); *H01R 43/0207* (2013.01); *H02K 3/50* (2013.01); *H02K 2203/09* (2013.01)

(58) Field of Classification Search
CPC ..... H01R 4/029; H01R 4/625; H01R 43/0207
See application file for complete search history.

(56) References Cited

U.S. PATENT DOCUMENTS

| 8,575,798 B2 | 11/2013 | Takahashi et al. |
| 2010/0194214 A1 | 8/2010 | Takahashi et al. |

(Continued)

FOREIGN PATENT DOCUMENTS

| CN | 88105055 A | 10/1988 |
| CN | 101274389 A | 10/2008 |

(Continued)

OTHER PUBLICATIONS

International Search Report and Written Opinion dated Apr. 14, 2020, directed to International Application No. PCT/JP2020/003627. 14 pages.

(Continued)

*Primary Examiner* — Sherman Ng
(74) *Attorney, Agent, or Firm* — Morrison & Foerster LLP

(57) ABSTRACT

Provided are a busbar unit and a method of manufacturing thereof configured to prevent an increase in resistance at a connection portion therebetween, to provide a good connection condition, and to easily achieve even a complicated wiring structure, in the case of connecting between a busbar and a pre-welded member (a terminal, another busbar, or the like) made of a metal material different from that of the busbar. A busbar unit includes a busbar made of a first metal material, and a welded member made of a second metal material to be connected to an end portion of the busbar. A welded portion between the end portion of the busbar and the welded member is configured by pressure welding between end surfaces butted against each other.

7 Claims, 6 Drawing Sheets

(51) Int. Cl.
  *H01R 4/62* (2006.01)
  *H02K 3/50* (2006.01)

(56) References Cited

U.S. PATENT DOCUMENTS

| | | | |
|---|---|---|---|
| 2011/0133581 | A1 | 6/2011 | Ha |
| 2016/0028177 | A1 | 1/2016 | Nomura et al. |
| 2016/0231359 | A1* | 8/2016 | Nakamura ......... G01R 19/0092 |
| 2018/0156844 | A1* | 6/2018 | Kameko ............ G01R 19/0092 |
| 2022/0131449 | A1 | 4/2022 | Hongo |

FOREIGN PATENT DOCUMENTS

| | | | |
|---|---|---|---|
| CN | 101685687 | A | 3/2010 |
| CN | 102489866 | A | 6/2012 |
| CN | 104400209 | A | 3/2015 |
| CN | 108879131 | A | 11/2018 |
| DE | 102011090184 | A1 | 7/2013 |
| EP | 0050092 | A2 | 4/1982 |
| EP | 0050092 | A3 | 4/1982 |
| EP | 3139443 | A1 | 3/2017 |
| EP | 3930155 | A1 | 12/2021 |
| JP | S54-24242 | A | 2/1979 |
| JP | 1992-143085 | A | 5/1992 |
| JP | 4661849 | B2 | 1/2011 |
| JP | 5904698 | B2 | 3/2016 |
| JP | 2017-123318 | A | 7/2017 |
| KR | 10-2015-0101154 | A | 9/2015 |

OTHER PUBLICATIONS

The First Office Action dated Sep. 30, 2022, directed to CN Application No. 202080007080.7; 15 pages.

Mori et al. (Jun. 27, 2013). "Joining by plastic deformation," CIRP Annals, 62(2): 673-694.

Supplementary European Search Report dated Mar. 11, 2022, directed to EP Application No. 20760135.2; 6 pages.

Stroiman et al. (Jan. 2002). "Cold-welding of aluminium and copper," Welding International, 16(6): 488-490.

Office Action dated Jan. 25, 2023, directed to IN Application No. 202147039620; 5 pages.

Communcation pursuant to Article 94(3) EPC dated May 24, 2023, directed to EP Application No. 20 760 135.2; 6 pages.

\* cited by examiner

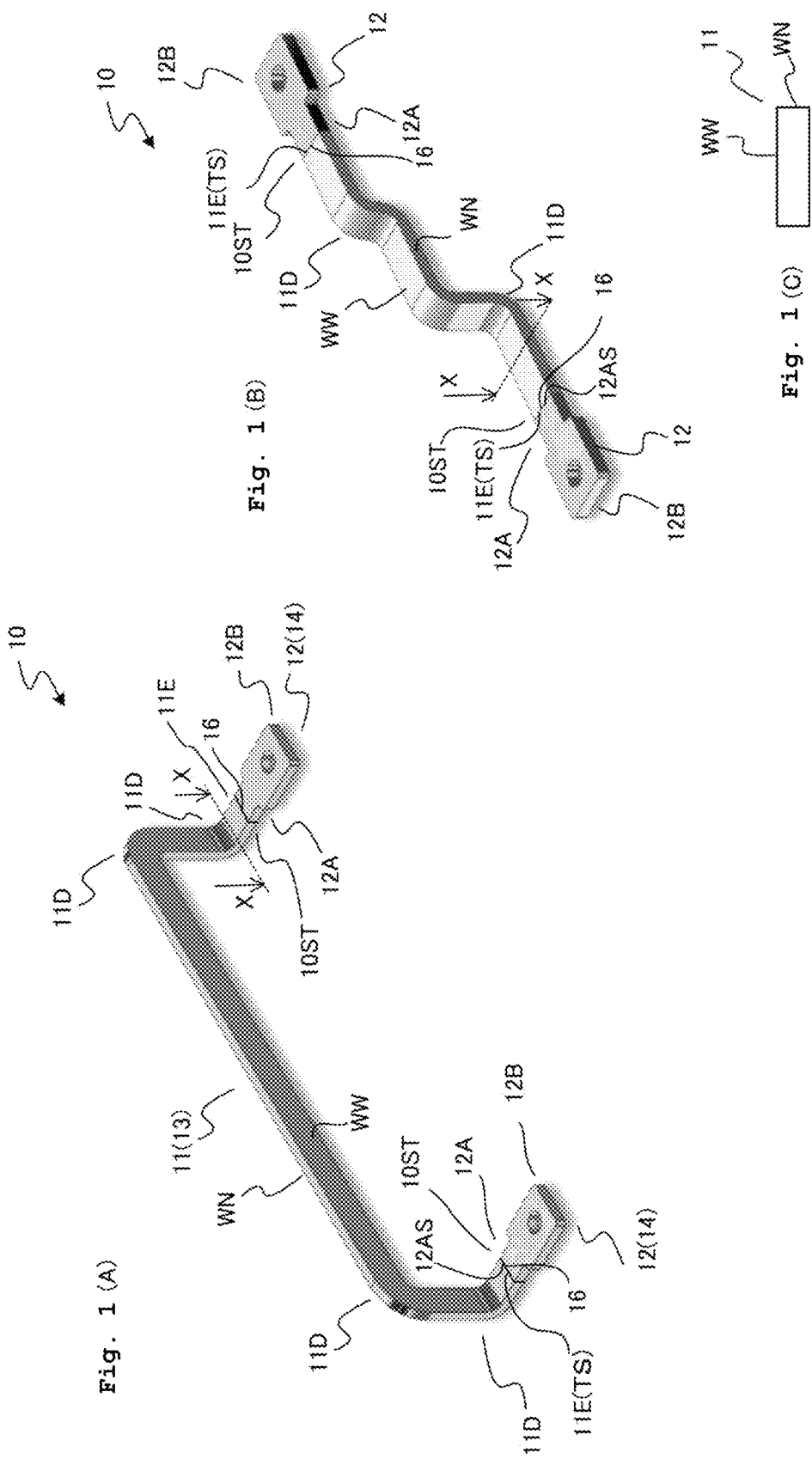

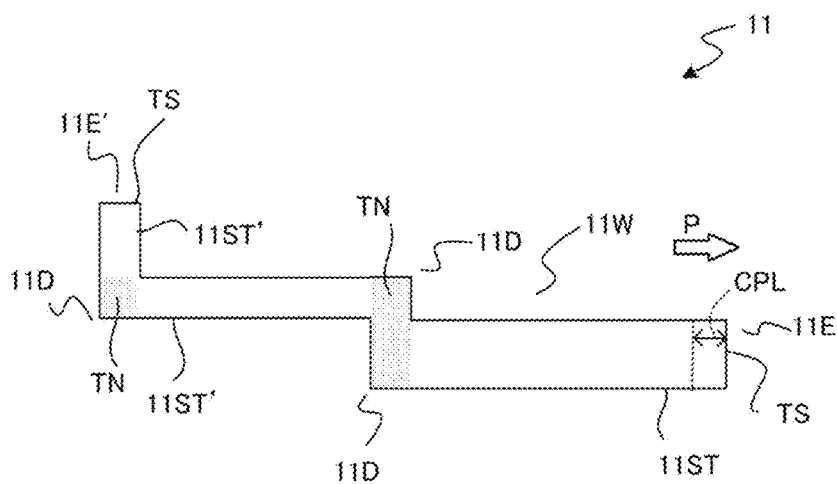
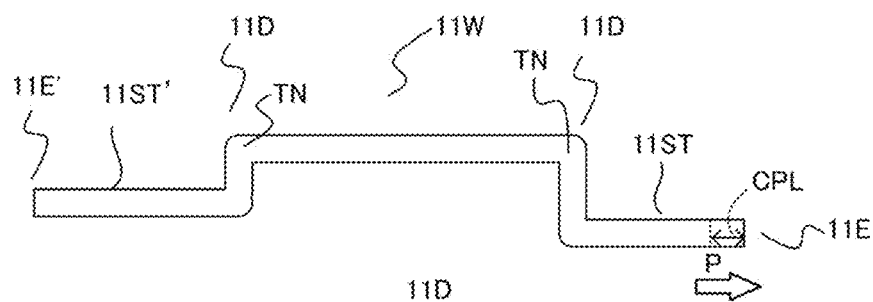
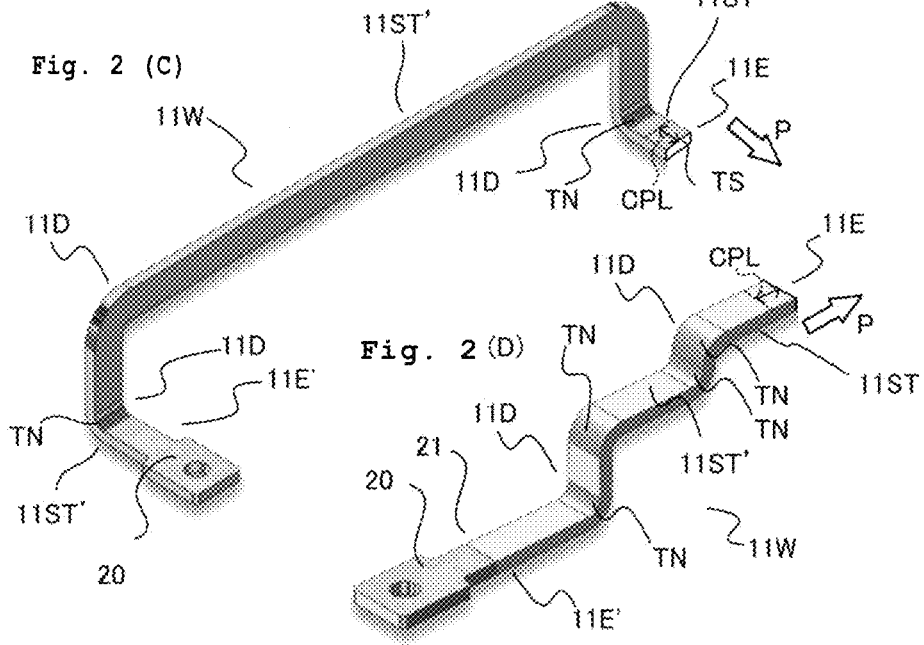

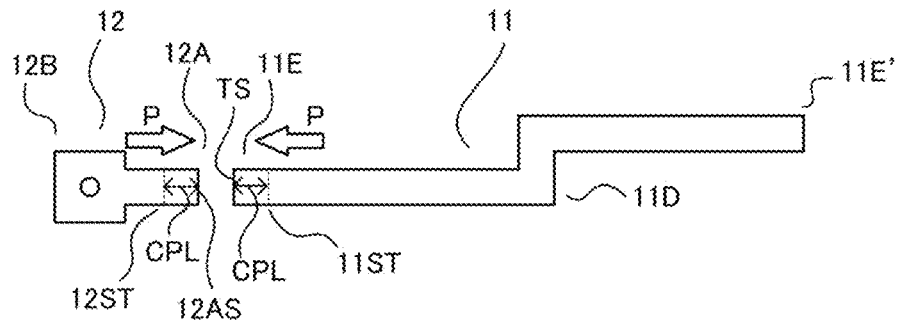
Fig. 5 (A)
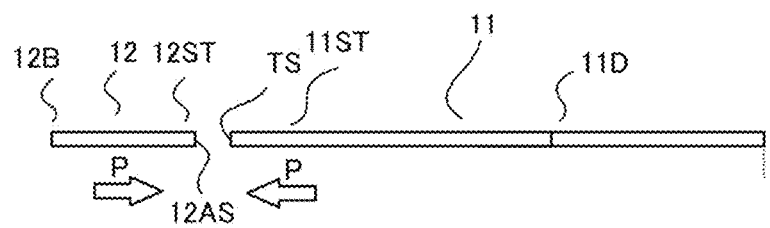
Fig. 5 (B)
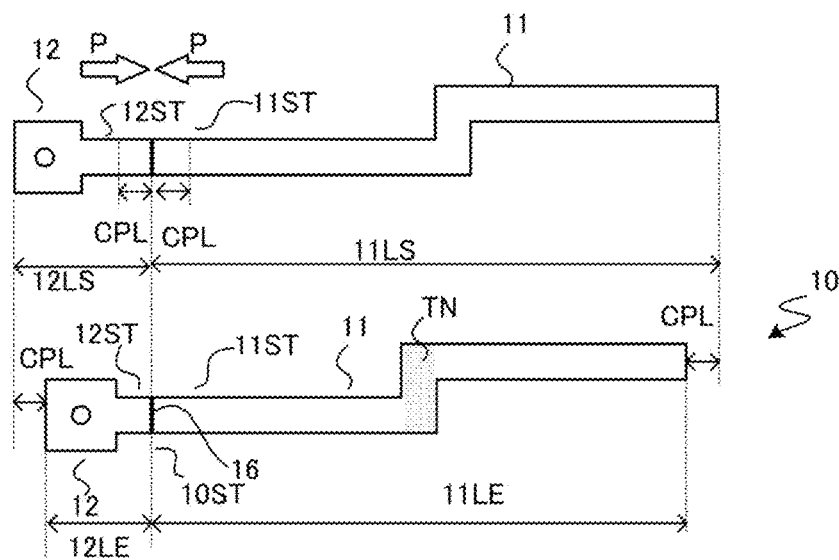
Fig. 5 (C)
Fig. 5 (D)
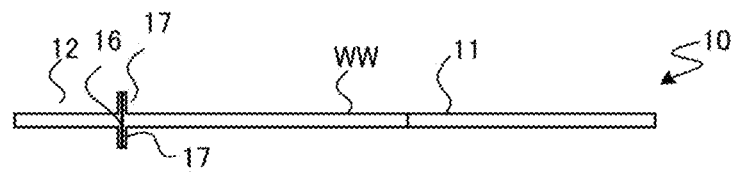
Fig. 5 (E)
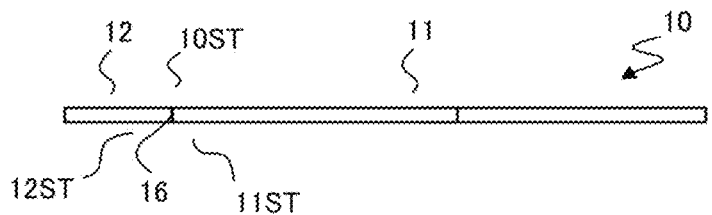
Fig. 5 (F)

BUSBAR UNIT AND METHOD OF MANUFACTURING BUSBAR UNIT

CROSS-REFERENCE TO RELATED APPLICATIONS

This application is a U.S. national phase patent application of International Patent Application No. PCT/JP2020/003627, filed Jan. 31, 2020, which claims priority to Japanese Patent Application No. 2019-027557, filed Feb. 19, 2019, the entire contents of each of which are incorporated herein by reference.

FIELD OF THE DISCLOSURE

The present invention relates to a busbar unit and a method of manufacturing the busbar unit.

BACKGROUND OF THE DISCLOSURE

Conventionally, busbars are known as wiring members between components. By way of example, in manufacturing a stator constituting a motor, a plurality of coils are annularly disposed by sequentially attaching coils wound on a plurality of slots (teeth) provided on an inner peripheral surface of an annular stator core, or by sequentially winding a coil member (for example, a copper wire or the like) on the individual slots. In this case, both end portions (a starting end portion and a terminal end portion) of the winding of the coil are welded or connected by screwing to rod-like (semi-circular) or annular busbars, which extend in a circumferential direction of the stator core, directly or through joint members (refer to Patent Literatures 1 and 2, for example).

As materials for such components (coils, busbars, and the like), often used are, in general, copper (Cu) having high electrical conductivity, aluminum (Al) having light weight, and the like. In connecting a plurality of components, it is common for the components to be made of different metal materials.

PATENT LITERATURE

Patent Literature 1: Japanese Patent No. 5904698
Patent Literature 2: Japanese Patent No. 4661849

SUMMARY OF THE DISCLOSURE

However, in connecting a plurality of components, connecting components made of different metal materials is not as easy as connecting the components made of the same metal material.

More specifically, taking the case of connecting an aluminum component (for example, a busbar) and a copper component (for example, a terminal) as an example, aluminum is apt to oxidize and deform. Therefore, connection by soldering (brazing) or general welding causes problems during use specifically in a high current range such as the occurrence of creep deformation and insufficient connection strength. Obtaining sufficient connection strength by welding requires a special method or apparatus, and hence is not easy.

Screwing is a connection method which substitutes as soldering or welding. In the case of screwing, increase in resistance at a connection portion is inevitable compared to a direct connection between metals. Specifically, in a case where one of the components is made of aluminum, there is also the problem of the screw connection becoming loose due to deformation. Furthermore, connection by screwing leads to problems such as an increase in the number of components, increase in complexity (increase in man-hour) during a connection step.

Furthermore, with advancement in downsizing and the increased precision of various types of apparatuses, there is an increase in demand for forming wiring structures of components which make up the various types of apparatuses into three-dimensional and complicated shapes, for the purpose of saving space. However, it is difficult for connection methods of the busbar which utilizes welding, screwing, or the like to flexibly meet the demand.

In view of these actual circumstances, an object of the present invention is to provide a busbar unit and a method of manufacturing thereof configured to prevent an increase in resistance at a connection portion therebetween, to provide a good connection condition, and to easily achieve even a complicated wiring structure, in the case of welding between a busbar and a pre-welded member (a terminal, another busbar, or the like) made of a metal material different from that of the busbar.

An aspect of the present invention provides a busbar unit including: a busbar made of a first metal material; and a welded member made of a second metal material, the welded member being connected to an end portion of the busbar. A welded portion between the end portion and the second metal material is configured by pressure welding with end surfaces butted against each other.

An aspect of the present invention also provides a method of manufacturing a busbar unit for connecting a pre-welded member made of a second metal material to an end portion of a busbar made of a first metal material, the method including: a step of butting an end surface of the end portion and an end surface of the pre-welded member against each other and pressure welding them to form a welded portion.

The present invention can provide a busbar unit and a method of manufacturing the same configured to prevent an increase in resistance at a connection portion therebetween, to provide a good connection condition, and to easily achieve even a complicated wiring structure, in the case of welding between a busbar and a pre-welded member (a terminal, another busbar, or the like) made of a metal material different from that of the busbar.

BRIEF DESCRIPTION OF FIGURES

FIGS. 1(A) to 1(C) include 1(A) an external perspective view of a busbar unit of the present embodiment, 1(B) an external perspective view thereof, and 1(C) a cross sectional view thereof.

FIGS. 2(A) to 2(D) include 2(A) a front view of a busbar of the present embodiment, 2(B) a side view thereof, and 2(C) and 2(D) external perspective views thereof.

FIG. 5(A) is a plan view illustrating a method of manufacturing a bus bas joint of the present embodiment, FIG. 5(B) is a side view thereof, FIG. 5(C) is a plan view thereof, FIG. 5(D) is a plan view thereof, FIG. 5(E) is a side view thereof, and FIG. 5(F) is a side view thereof.

DETAILED DESCRIPTION OF THE DISCLOSURE

Figure 3:
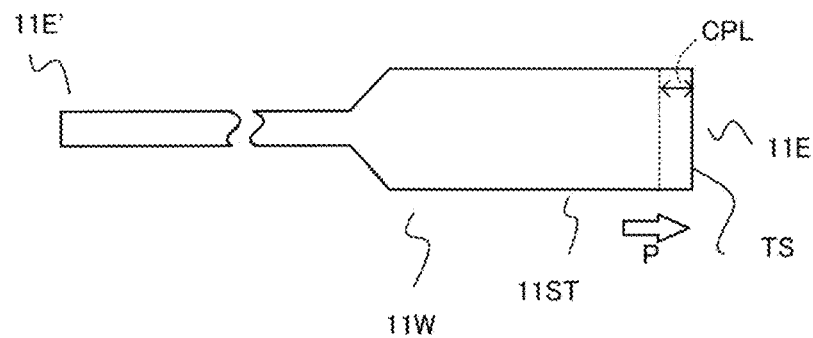
FIGS. 3(A) to 3(C) include 3(A) a front view of a busbar of the present embodiment, 3(B) a front view thereof, and 3(C) an external perspective view thereof.
Figure 3:
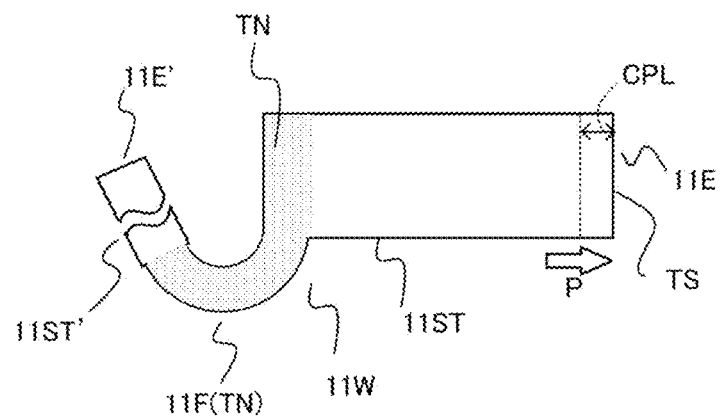
Figure 3:
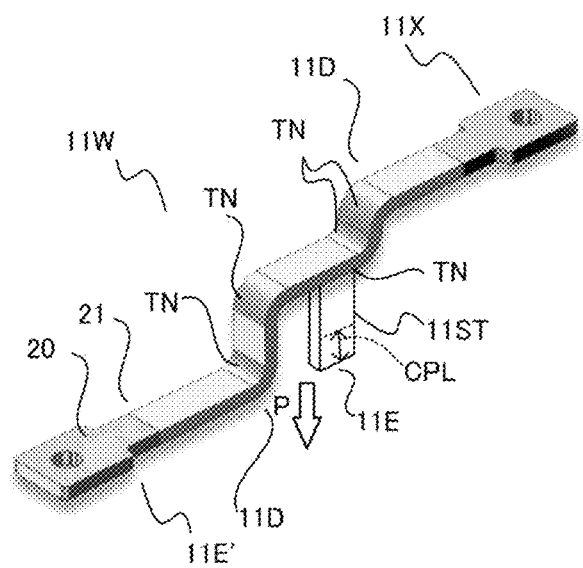

An embodiment of the present invention will be described below with reference to the drawings.

FIGS. 1(A) to 2(C) include external perspective views of busbar units 10 of the present embodiment. FIGS. 1(A) and 1(B) are drawings illustrating examples of a busbar 11 having different shapes, and FIG. 1(C) is a cross sectional view taken along line X-X of FIGS. 1(A) and 1(B). The busbar unit 10 of the present embodiment includes the busbar 11 made of a first metal material 13 and welded members 12 made of a second metal material 14.

More specifically, in the busbar unit 10, welded members 12 are pressure welded to end portions 11E (hereinafter referred to as busbar end portions 11E) of the busbar 11. The busbar 11 has at least one busbar end portion 11E. Referring to FIGS. 1(A) to 1(C), examples of the busbar unit 10 will be described in which each busbar 11 has the two busbar end portions 11E, and the welded member 12 is connected to each of the busbar end portions 11E. A case where every pre-welded member 12 is a terminal 12 having the same configuration (shape) is described here as an example. However, in a case where a plurality of pre-welded members 12 are welded to the single busbar 11, the pre-welded members 12 may have different shapes. In a case where there are a plurality of busbar end portions 11E, the pre-welded member 12 may not be welded to every busbar end portion 11E.

The busbar 11 according to the present embodiment is a wiring member for connecting a plurality of components to each other, and the pre-welded member 12 is a terminal or another busbar. To be more specific, in the case of connecting an end portion of a component (for example, a coil) to another component, a "terminal" according to the present embodiment refers to a component constituting an outlet portion thereof, and a "busbar" refers to a wiring member having a predetermined length to connect a plurality of components which are spaced apart (for example, a coil and a terminal, a coil and another busbar, a coil and another component, a terminal and another terminal, a busbar and another busbar, or the like).

A material (the first metal material 13) for the busbar 11 is, for example, aluminum (Al). A material (the second metal material 14) for the welded member (pre-welded member) 12 is a metal different from the first metal material 13, e.g., copper (Cu), in this example.

The busbar 11 is formed from, for example, a strip-shaped flat conductor that is punched and/or bent into a desired shape. Namely, the busbar 11 is the conductor whose cross section (cross section along line X-X of FIGS. 1(A) and 1(B)) when cutting in a direction crossing (orthogonal to) a straight portion extending in a strip longitudinal direction has the shape of a rectangle (or a rectangle with rounded corners) having wider surfaces WW and narrower surfaces WN as shown in FIG. 1(C).

FIGS. 2(A) to 2(D) and 3(A) to 3(C) are schematic views illustrating examples of the busbar 11. FIG. 2(A) is a front view (top view) of the busbar 11. FIG. 2(B) is a side view thereof. FIGS. 2(C) and 2(D) are perspective views thereof. FIGS. 3(A) and 3(B) are front views (top views) of the busbars 11. FIG. 3(C) is a perspective view thereof.

The busbar 11 has one busbar end portion 11E to be connected to the pre-welded member 12, and the other busbar end portion 11E to be connected to another optional configuration (for example, another pre-welded member 12, a terminal, a busbar, a component, or the like). In each of the busbar end portions 11E, an end surface TS is exposed. In the busbar 11 of the present embodiment, the pre-welded members 12 can be welded to both the busbar end portions 11E. The following description mainly describes a case where the pre-welded member 12 is welded to the one busbar end portion 11E, as an example. For the sake of explanation, the busbar end portion 11E on one side to which the pre-welded member 12 is to be welded is referred to as a busbar end portion 11E, and the busbar end portion 11E on the other side is uniquely referred to as a busbar end portion 11E' (the other busbar end portion).

The shape of the busbar 11 is freely determined. For example, as shown in FIG. 2(A), the busbar 11 is a strip-shaped flat conductor in which the busbar end portion 11E and the other busbar end portion 11E' have different shapes (sizes), and which includes one or a plurality of bent portions 11D in a course between the one busbar end portion 11E and the other busbar end portion 11E' in a two-dimensional plane. As shown in FIGS. 2(B) to 2(D), one or a plurality of bent portions 11D may be included in a three-dimensional space, or one or more bent portions 11D in a two-dimensional plane and one or more bent portions 11D in a three-dimensional space may be combined in a course between the busbar end portion 11E and the other busbar end portion 11E'.

Referring to FIGS. 2(C) and 2(D), a connection portion (a terminal or an engagement portion) 20 to be connected to another configuration may be provided in advance in the other busbar end portion 11E'. As an example, FIG. 2(C) shows a case where the busbar 11 and the terminal 20 are made of the same metal material (for example, copper).

In a case where the terminal 20 (a terminal different from the welded member 12) is provided in advance in the other busbar end portion 11E' of the busbar 11, as shown in FIG. 2(D), the busbar 11 and the terminal 20 may be made of different metal materials. By way of example, the busbar 11 may be made of the first metal material 13 (for example, aluminum), and the terminal 20 may be made of a metal material different therefrom (for example, copper).

Furthermore, as shown in FIG. 3(A), the busbar end portion 11E may have a shape of a flat conductor, and the other busbar end portion 11E' may have a different shape such as a round wire. As shown in FIG. 3(B), a curved portion 11F may be included therein. As shown in FIG. 3(C), the busbar 11 may be bent (branched) in a plurality of directions, for example, in the shape of the letter Y or in the shape of a cross in a two-dimensional plan view, such that a plurality of the other busbar end portion 11E' and 11X are present in addition to the busbar end portion 11E. In this case, the terminal 20 may be connected to at least any one of the other busbar end portion 11E' and the other end portion 11X. At least any of these (FIGS. 3(A) to 3(C) and 4(A) to 4(E) may be combined in the configuration.

As shown in FIG. 2(A) and the like, the busbar 11 includes a busbar wiring portion 11W connecting (intermediate) between the busbar end portion 11E and the other busbar end portion 11E'. The busbar wiring portion 11W includes at least a busbar straight portion 11ST. The busbar straight portion 11ST of the present embodiment is a portion that is continuous from the busbar end portion 11E and has a straight region along a press direction P (indicated with an open arrow) during a press (pressure welding) step, and the length of the straight region is longer than a press length (a pressure welding amount) CPL. The busbar wiring portion 11W may have one or more another busbar straight portions 11ST', in addition to the busbar straight portion 11ST.

More specifically, the busbar wiring portion 11W may have a shape including only the busbar straight portion 11ST (FIG. 3(A)), a shape including the busbar straight portion 11ST, the another busbar straight portion 11ST', and at least one direction changing portion TN (FIGS. 2(A) to A(D), 3(B), and 3(C)), or a shape of a combination of at least one of the shapes illustrated in FIGS. 3(A) to 3(C) and 4(A) to 4(D).

The direction changing portion TN is a bent (curved) portion to change an extending direction (the direction of a current path) of the strip longitudinal direction. More specifically, when the busbar wiring portion 11W has a bent shape (FIGS. 2(A) to 2(D), 3(B), and 3(C)), the busbar wiring portion 11W has at least two straight portions extending in different directions (for example, the busbar straight portion 11ST extending in a first direction and the another busbar straight portion 11ST' extending in a second direction) in the path of a current, and the direction changing portion TN disposed therebetween (in some cases, there are also two another busbar straight portions 11ST' and the direction changing portion TN therebetween). Note that, the curved portion 11F illustrated in FIG. 3(B) is a part of the direction changing portion TN.

For example, in the case of the busbar 11 illustrated in FIG. 3(C), the other busbar end portion 11E' and the another busbar end portion 11X are branched from the busbar end portion 11E through the direction changing portions TN, so as to approximately have the shape of the letter T in the side view, and the busbar 11 is pressed downward in the drawing. Therefore, in the busbar end portion 11E, the busbar straight portion 11ST that is longer than the pressure welding amount CPL is provided along the press direction P.

In the present embodiment, the end portion of the pre-welded member 12 and a first end portion 12A of the busbar 12 are directly butted and welded.

Referring to FIGS. 4(A) to 4(E), examples of the pre-welded member 12 will be described by taking a case where the pre-welded member 12 is a terminal, as an example.

FIGS. 4(A) to 4(E) include schematic diagrams illustrating examples of the terminal 12. FIGS. 4(A) to 4(C) and 4(E) are front views (top views) of the terminal 12, and FIG. 4(D) is a side view of the terminal 12.

The terminal 12 has a first end portion 12A to be connected to the busbar end portion 11E, and a second end portion 12B to be connected to an external configuration (for example, a wiring member, another busbar, another component, or the like to be connected to a power supply or the like). An end surface 12AS is exposed in the first end portion 12A, and an end surface 12BS is exposed in the second end portion 12B.

The shape of the terminal 12 is freely determined. For example, as shown in FIG. 4(A), the shape of the first end portion 12A may be the same as that of the busbar end portion 11E, i.e., the flat conductor, and the second end portion 12B may be provided with an engagement portion 12C to be engaged with another component. As shown in FIG. 4(B), the shape of the first end portion 12A may be the same as that of the busbar end portion 11E, i.e., the flat conductor, and the second end portion 12B may have a different shape such as a round wire or a thin (thick) flat conductor. As shown in FIG. 4(C), one or a plurality of bent portions 12D may be included in a two-dimensional plane in a course between the first end portion 12A and the second end portion 12B. As shown in FIG. 4(D), one or a plurality of bent portions 12D may be included in three-dimensional space. As shown in FIG. 4(E), a curved portion 12E may be included. At least any of these (FIGS. 4(A) to 4(E)) may be combined.

The terminal 12 includes a terminal wiring portion 12W connecting (between) the first end portion 12A and the second end portion 12B. The terminal wiring portion 12W is shorter than, for example, the busbar wiring portion 11W. The terminal wiring portion 12W includes at least a pre-welded member straight portion 12ST. The pre-welded member straight portion 12ST of the present embodiment has a straight region that is continuous from the first end portion 12A and along the press direction P in the press (pressure welding) step. The length of the straight region is longer than the press length (pressure welding amount) CPL. The terminal wiring portion 12W may have another pre-welded member straight portion 12ST', in addition to the pre-welded member straight portion 12ST.

Figure 4:
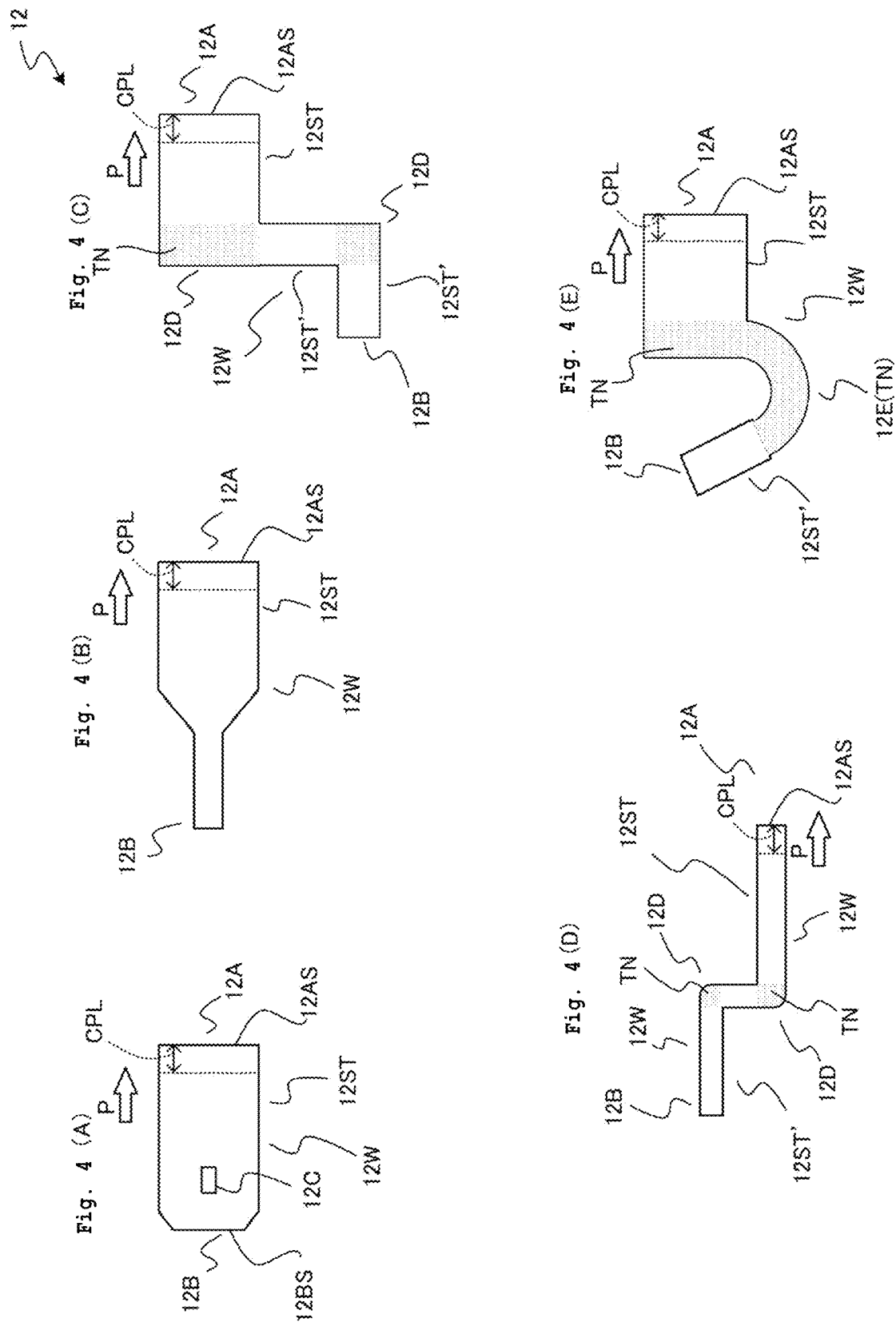
FIGS. 4(A) to 4(E) include 4(A) to 4(C) front views of pre-welded members (terminals) of the present embodiment, 4(D) a side view thereof, and 4(E) a front view thereof.

To be more specific, the terminal wiring portion 12W has a shape including only the pre-welded member straight portion 12ST (FIGS. 4(A) and 4(B)), a shape including the pre-welded member straight portion 12ST, the another pre-welded member straight portion or portions 12ST', and at least one direction changing portion TN (illustrated by being dot hatched in FIG. 4) (FIGS. 4(C) to 4(E)), or a shape of a combination of at least any of these (FIGS. 4(A) to 4(E)).

The direction changing portion TN is a bent (curved) portion so as to change an extending direction (the direction of a current path) of the strip longitudinal direction. More specifically, when the terminal wiring portion 12W has a bent shape (for example, FIGS. 4(C) and 4(D)), the terminal wiring portion 12W has at least two straight portions (for example, the pre-welded member straight portion 12ST extending in a first direction and the another pre-welded member straight portion 12ST' extending in a second direction) extending in different directions in a current path, and the direction changing portion TN disposed therebetween (in FIGS. 4(C) and 4(D), there are also different two another pre-welded member straight portions 12ST' and the direction changing portion TN disposed therebetween). Note that, the curved portion 12E shown in FIG. 4(E) is a part of the direction changing portion TN.

In the present embodiment, the busbar end portion 11E and the first end portion 12A of the terminal 12 are directly butted against each other and welded. Details will be described later, as shown in FIG. 5, the end surface TS of the busbar straight portion 11ST of the busbar end portion 11E and the end surface 12AS of the pre-welded member straight portion 12ST of the first end portion 12A of the pre-welded member 12 are butted against each other and pressed (for example, cold pressure welded), to form a welded portion 16.

The end surface TS of the busbar 11 is a surface of a terminal end that is parallel to a cross section when the busbar straight portion 11ST is sectioned in a direction crossing (orthogonal to) the press direction P in the press step. The end surface 12AS of the terminal 12 is a surface of a terminal end that is parallel to a cross section when a pre-welded member straight portion 12ST is sectioned in a direction crossing (orthogonal to) the press direction P in the press step.

Therefore, as shown in FIGS. 1(A) to 1(C), the welded portion 16, by pressure welding between the busbar end portion 11E and the first end portion 12A of the terminal 12, is formed within a straight portion 10ST (straight portion 10ST, excluding the direction changing portion TN, of the busbar unit 10) of the busbar unit 10 after welding. In other words, the welded portion 16 is present in a position that is not included in the direction changing portion TN (the corner portion) of the busbar unit 10.

The end surface 12AS of the first end portion 12A of the terminal 12 is configured into a shape (size) conformable to, for example, the shape of the busbar end portion 11E.

More specifically, the end surface 12AS of the first end portion 12A (the pre-welded member straight portion 12ST) is configured into a rectangular shape and the same size as the end surface TS (an approximately conformable rectangular shape), so as to be approximately conformable to the shape (a flat rectangular shape in this example) of the end surface TS of the busbar straight portion 11ST of the busbar end portion 11E. On the other hand, the shape (of the end surface 12BS) of the second end portion 12B is optionally selected according to the shape of a wire or the like to be connected.

Note that, the pre-welded member 12 may be a busbar. In this case, the busbar has the same configuration as that in FIGS. 2 and 3, and the first end portion 12A, the end surface 12AS thereof, and the pre-welded member straight portion 12ST of the pre-welded member 12 correspond to the busbar end portion 11E, the end surface TS thereof, and the busbar straight portion 11ST of the busbar 11.

In FIGS. 1(A) to 1(C), for the sake of explanation, the welded portions 16 are illustrated by solid lines, but in the case of cold pressure welding, the welded portions 16 are integrally and reliably welded to the extent of being difficult to recognize (almost invisible) the positions of the end surface TS of the busbar end portion 11E and the end surface 12AS of the first end portion 12A by visual check of appearance. Thereby, it is possible to significantly increase the stability of the welded portions 16 and obtain sufficient connection strength, as compared to the configuration of connection between the pre-welded member 12 and the busbar 11 with an adhesive (a fixing material, brazing, or the like), or by welding, screwing, or the like.

Since the busbar 11 and the pre-welded member 12 can be integrally (continuously and smoothly) connected, it is possible to prevent an increase in resistance at the welded portion 16 and an increase in complexity of configuration (the welded portion 16 has a minimum necessary configuration), as compared to the case of connecting the both by welding, bonding, screwing, or the like.

Furthermore, with advancement in downsizing and increased precision of various types of apparatuses, there is an increase in demand for forming wiring structures of components constituting the various types of apparatuses into three-dimensional and complicated shapes, for the purpose of saving space. According to the busbar unit 10 of the present embodiment, it is possible to flexibly and easily provide a wiring structure of a complicated shape, while minimizing the configuration of the welded portion 16, by pressure welding (repetition of welding as many times as necessary) between the busbar 11 of a desired shape and the pre-welded member (the terminal or the another busbar) 12.

Note that, the welded members 12 are welded to both ends of the busbar 11 in FIGS. 1(A) to 1(C), but, for example, a component such as a coil may be connected to the one end portion (the busbar end portion 11E) of the busbar 11.

In a case where the busbar 12 and the terminal 20 illustrated in FIGS. 1(B), 2(D), and the like are made of different metal materials, a welded portion 21 therebetween is also configured by pressure welding (cold pressure welding), just as with the welded portion 16 between the busbar 11 and the welded member 12 described in the present embodiment. Namely, an end surface TS of the other busbar end portion 11E' of the busbar 11 and an end surface of the terminal 20 on the side of the busbar 11 are butted against each other and (cold) pressure welded, to weld both components.

A method of manufacturing the busbar unit 10 of the present embodiment will be described with reference to FIGS. 5(A) to 5(F) and 6(A) to 6(F). FIGS. 5(A) to 5(F) include drawings for explaining a manufacturing process of the busbar unit 10 by connecting the pre-welded member (terminal) 12 to the one busbar end portion 11E of the busbar 11. FIG. 5(A) is a plan view. FIG. 5(B) is a side view of FIG. 5(A) viewed from below. FIGS. 5(C) and 5(D) are plan views, and FIGS. 5(E) and 5(F) are side views of FIG. 5(D) viewed from below.

First, as shown in FIGS. 5(A) and 5(B), the busbar 11 and the terminal 12 are prepared into desired shapes. The busbar 11 and the terminal 12 are held by a not-illustrated welding apparatus (a pressure welding apparatus).

As already described, the busbar 11 (the busbar end portion 11E) has the busbar straight portion 11ST that is a straight region along a press direction P (indicated with an open arrow) and whose length is longer than the press length (pressure welding amount) CPL. The terminal 12 has the pre-welded member straight portion 12ST that is a straight region along the press direction P and whose length is longer than the press length (pressure welding amount) CPL.

As shown in FIG. 5(C), the end surface TS of the busbar straight portion 11ST of the busbar 11 and the end surface 12AS of the pre-welded member straight portion 12ST of the terminal 12 are butted against each other to be in contact with each other. As shown in FIGS. 5(D) and 5(E), while butting against each other, the busbar straight portion 11ST and the pre-welded member straight portion 12ST are each pressed by the predetermined pressure welding amount (press length) CPL into each other along a straight extending direction of the busbar straight portion 11ST and the pre-welded member straight portion 12ST to perform (cold) pressure welding.

Namely, the busbar 11 before welding is set such that the length 11LS (FIG. 5(C)) thereof along the press direction P is longer than the length 11LE (FIG. 5(D)) after being welded to the terminal 12 (in a complete state) along the press direction P by the pressure welding amount CPL. In the same manner, the terminal 12 before welding is set such that the length 12LS (FIG. 5(C)) thereof along the press direction P is longer than the length 12LE after being welded to the busbar 11 (in a complete state) along the press direction P by the pressure welding amount CPL.

Thus, as already described, the busbar straight portion 11ST of the busbar 11 is set so as to have the straight region longer than the pressure welding amount CPL. The pre-welded member straight portion 12ST of the terminal 12 is set so as to have the straight region longer than the pressure welding amount CPL.

As described above, the end surface TS of the busbar straight portion 11ST and the end surface 12AS of the pre-welded member straight portion 12ST are butted against each other and pressed, and shortened each other by the pressure welding amount CPL to form the welded portion 16 between the busbar 11 and the terminal 12. Accordingly, the welded portion 16 between the busbar 11 and the terminal 12 is also formed in the straight portion 10ST (a region excluding the direction changing portions TN (corner portion: shown by being dot hatched in FIG. 5(D))) of the busbar unit 10. In other words, the welded portion 16 is not included in the direction changing portion TN (corner portion) of the busbar unit 10 (FIG. 5(D)).

As shown in FIG. 5(E), in the welded portion 16, a burr 17 protruding in a perpendicular direction with respect to the press direction P (wider surfaces WW) occurs owing to the press. Accordingly, after formation of the welded portion 16, the burr 17 is removed by cutting or machining (FIG. 5(F)). Note that, as already described, the welded portion 16 is difficult to recognize (invisible) in actual fact, but is illustrated by a solid line for the sake of explanation (the same is applied hereinafter).

FIGS. 5(A) to 5(F) illustrate the case of welding the terminal 12 to only the one busbar end portions 11E of the busbar 11, but a pre-welded member (a terminal or another busbar) 12 may be welded to the other busbar end portion 11E' too. In this case, the welded portion 16 is formed by pressure welding between the pre-welded member 12 and the busbar 11, just as with above, and a burr 17 is removed.

Figure 6:
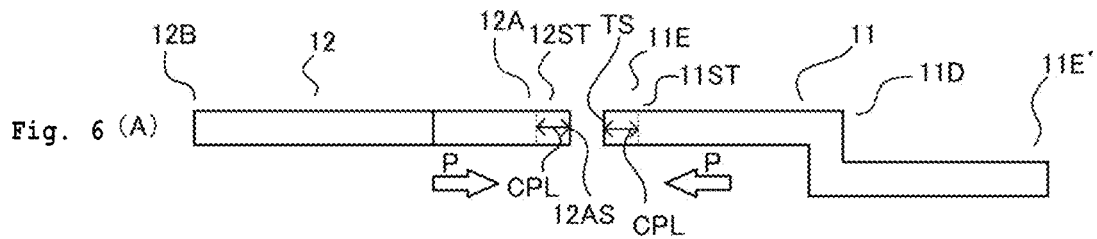
FIGS. 6(A) to 6(F) include 6(A) a plan view illustrating a method of manufacturing a busbar unit of the present embodiment, 6(B) a side view thereof, 6(C) a plan view thereof, 6(D) a plan view thereof, 6(E) a side view thereof, and 6(F) a side view thereof.
Figure 6:
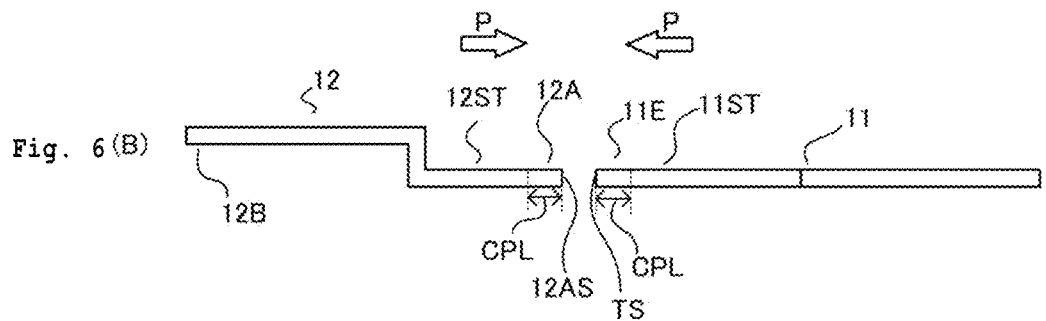
Figure 6:
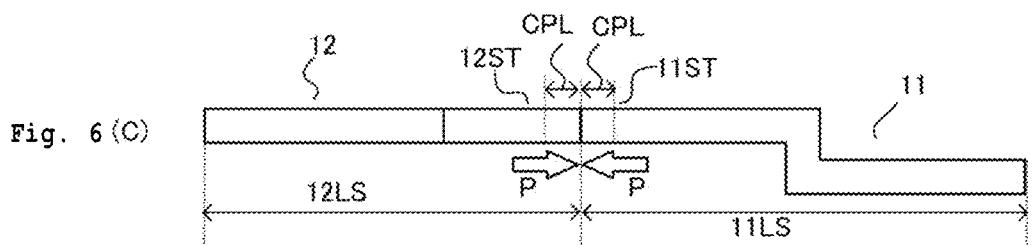
Figure 6:
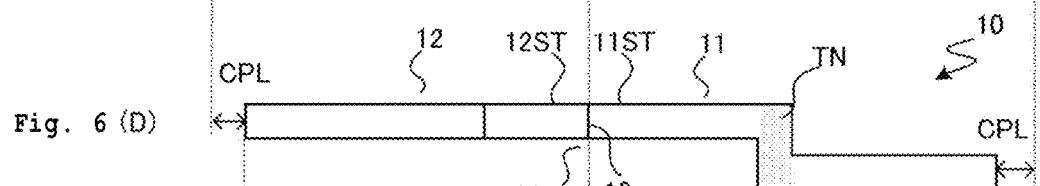
Figure 6:
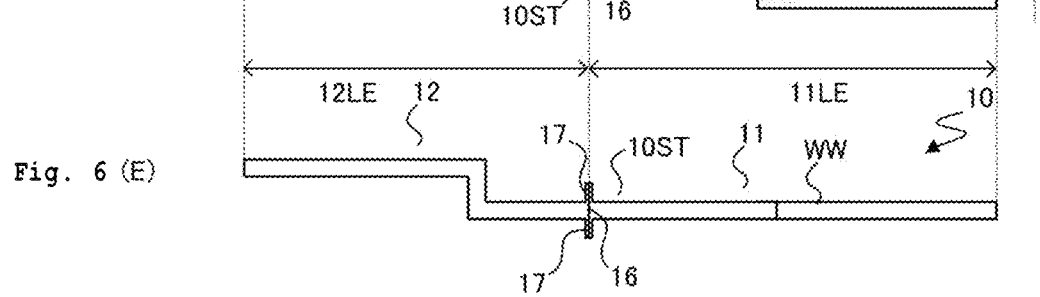
Figure 6:
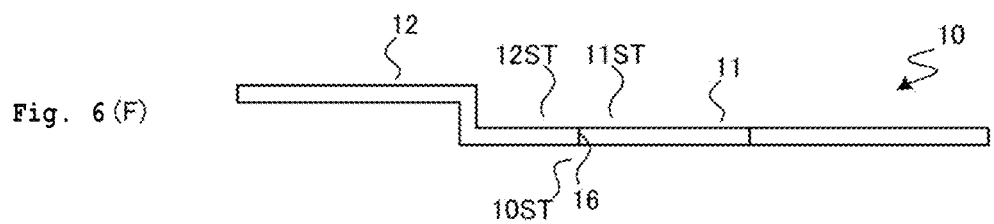

FIGS. 6(A) to 6(F) include drawings for explaining a manufacturing method of the busbar unit 10 in a case where the pre-welded member 12 is another busbar 12. FIG. 6(A) is a plan view. FIG. 6(B) is a side view of FIG. 6(A) viewed from below. FIGS. 6(C) and 6(D) are plan views, and FIGS. 6(E) and 6(F) are side views of FIG. 6(D) viewed from below.

First, as shown in FIGS. 6(A) and 6(B), the busbar 11 and another busbar 12 having desired shapes are prepared. The busbar 11 and the another busbar 12 are held by a not-illustrated welding apparatus (pressure welding apparatus).

Note that, in a case where the pre-welded member 12 is a busbar, the first end portion 12A, the end surface 12AS thereof, the pre-welded member straight portion 12ST, and the second end portion 12B of the pre-welded member 12 can be read as a busbar end portion 11E, an end surface TS thereof, a busbar straight portion 11ST, and another busbar end portion 11E' of another busbar 11 (a busbar 11 different from the busbar 11 to be connected to the pre-welded member 12), respectively.

As already described, the busbar 11 (busbar end portion 11E) has the busbar straight portion 11ST that is a straight region along the press direction P (indicated with open arrows) and is longer than the press length (pressure welding amount) CPL. The pre-welded member (another busbar) 12 has the pre-welded member straight portion 12ST that is a straight region along the press direction P and is longer than the press length (pressure welding amount) CPL.

As shown in FIG. 6(C), the end surface TS of the busbar straight portion 11ST of the busbar 11 and the end surface 12AS of the pre-welded member straight portion 12ST of the another busbar 12 are butted against each other to be in contact with each other. As shown in FIGS. 6(D) and 6(E), while butting against each other, the busbar straight portion 11ST and the pre-welded member straight portion 12ST are each pressed by the predetermined pressure welding amount (press length) CPL into each other along a straight extending direction of the busbar straight portion 11ST and the pre-welded member straight portion 12ST to perform (cold) pressure welding.

Namely, the busbar 11 before welding is set such that the length 11LS (FIG. 6(C)) thereof along the press direction P is longer than a length 11LE (FIG. 6(D)) after being welded to the another busbar 12 (in a complete state) along the press direction P by the pressure welding amount CPL. In the same manner, the another busbar 12 before welding is set such that the length 12LS thereof along the press direction P is longer than a length 12LE after being welded to the busbar 11 (in a complete state) along the press direction P by the pressure welding amount CPL.

Thus, as already described, the busbar straight portion 11ST of the busbar 11 is set so as to have the straight region longer than the pressure welding amount CPL. The pre-welded member straight portion 12ST of the another busbar 12 is set so as to have the straight region longer than the pressure welding amount CPL.

As described above, the end surface TS of the busbar straight portion 11ST and the end surface 12AS of the pre-welded member straight portion 12ST are butted against each other and pressed, and shortened each other by the pressure welding amount CPL to form the welded portion 16 between the busbar 11 and the another busbar 12. Accordingly, the welded portion 16 between the busbar 11 and the another busbar 12 is also formed in the straight portion 10ST (a region excluding the direction changing portions TN (corner portion: shown by being dot hatched in FIG. 6(D))) of the busbar unit 10. In other words, the welded portion 16 is not included (FIG. 6(D)) in the direction changing portion TN (corner portion) of the busbar unit 10.

As shown in FIG. 6(E), in the welded portion 16, a burr 17 protruding in a perpendicular direction with respect to the press direction P (the wider surfaces WW) occurs owing to the press. Accordingly, after formation of the welded portion 16, the burr 17 is removed by cutting or machining (FIG. 6(F)). Note that, as already described, the welded portion 16 is difficult to recognize (invisible) in actual fact, but is illustrated by a solid line for the sake of explanation (the same is applied hereinafter).

FIGS. 6(A) to 6(F) illustrate the case of welding the another busbar 12 to only the one busbar end portion 11E of the busbar 11, but a pre-welded member (a terminal or another busbar) 12 may be welded to the other busbar end portion 11E' too. In this case, the welded portion 16 is formed by pressure welding between the pre-welded member 12 and the busbar 11, just as with above, and a burr 17 is removed.

In the case of FIGS. 6(A) to 6(F), the another busbar 12 may be made of the same type of metal material as the busbar 11, or a different metal material.

As described above, according to the busbar unit 10 of the present embodiment, even if the busbar 11 and the welded member 12 are made of different metal materials, it is possible to increase welding strength of the welded portion 16, to provide a stable and good connection condition, to prevent an increase in resistance, and to facilitate avoiding complication of the configuration.

The above example describes a case where the busbar 11 is made of aluminum and the welded members (pre-welded members) 12 are made of cupper, but the busbar 11 and the welded members (pre-welded members) 12 may be made of any metal materials, as long as they are applicable to cold pressure welding, such as non-ferrous metal materials. More specifically, each of the first metal material 13 and the second metal material 14 may be a metal material such as aluminum, an aluminum alloy, a copper nickel alloy, brass, zinc, silver, a silver alloy, nickel, gold, or another alloy, for example, or may be a material including tin plating, silver plating, or nickel plating. The busbar 11 (the first metal material 13) and the welded member (pre-welded member) 12 (the second metal material 14) may be made of the same type (same) of metal materials.

The busbar unit 10 of the present embodiment may contain a third metal material that is different from either of the first metal material 13 or the second metal material 14. In this case, an end surface of an end portion of the third metal material may be butted against the end surface of the busbar 11 and/or the end surface of the welded member 12 and (cold) pressure welded to each other.

The present invention is not limited to the embodiment described above, but as a matter of course, various modifications may be made within a range without deviating from the gist of the present invention.

The present invention is applicable to welding between components.

REFERENCE SIGNS LIST

10 busbar unit
10ST straight portion
11 busbar
11D bent portion
11E busbar end portion
11F curved portion
11ST busbar straight portion
11W busbar wiring portion
12 welded member (pre-welded member)
12W terminal wiring portion
12E curved portion
12ST pre-welded member straight portion
12TN direction changing portion
16 welded portion
17 burr

The invention claimed is:

1. A busbar unit comprising: a busbar made of a first metal material; and a welded member made of a second metal material different from the first metal material, the welded member being connected to an end portion of the busbar, wherein a welded portion between the end portion and the welded member is configured by pressure welding with end surfaces butted against each other to be in contact with each other, the end surfaces of the busbar and the welded member are each pressed into each other and shortened by a predetermined pressure welding amount.

2. The busbar unit according to claim 1, wherein the welded member is a terminal.

3. The busbar unit according to claim 1, wherein the welded member is another busbar.

4. A method of manufacturing a busbar unit for connecting a pre-welded member made of a second metal material to an end portion of a busbar made of a first metal material different from the second metal material, the method comprising: a step of butting an end surface of the end portion and an end surface of the pre-welded member against each other to be in contact with each other and pressure welding them to form a welded portion, the end surfaces of the busbar and the pre-welded member are each pressed into each other and shortened by a predetermined pressure welding amount.

5. The method of manufacturing a busbar unit according to claim 4, further comprising: a step of removing a burr occurring in the pressure welding, after the forming of the welded portion.

6. The method of manufacturing a busbar unit according to claim 4, wherein the pre-welded member is a terminal.

7. The method of manufacturing a busbar unit according to claim 4, wherein the pre-welded member is another busbar.

* * * * *